(12) United States Patent
Nozoe et al.

(10) Patent No.: US 9,815,927 B2
(45) Date of Patent: Nov. 14, 2017

(54) COPOLYMER, RESIN COMPOSITION CONTAINING THE COPOLYMER, FILM AND PHASE DIFFERENCE FILM

(71) Applicant: FUJIFILM Corporation, Tokyo (JP)

(72) Inventors: Yutaka Nozoe, Kanagawa-ken (JP); Ryosuke Takada, Kanagawa-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 154 days.

(21) Appl. No.: 14/884,281

(22) Filed: Oct. 15, 2015

(65) Prior Publication Data

US 2016/0108158 A1 Apr. 21, 2016

(30) Foreign Application Priority Data

Oct. 16, 2014 (JP) ................. 2014-211478

(51) Int. Cl.
| | | |
|---|---|---|
| *C08F 212/10* | (2006.01) | |
| *G02F 1/13363* | (2006.01) | |
| *G02B 1/08* | (2006.01) | |
| *G02B 5/30* | (2006.01) | |
| *C08J 5/18* | (2006.01) | |
| *C09D 125/12* | (2006.01) | |

(52) U.S. Cl.
CPC ............ *C08F 212/10* (2013.01); *C08J 5/18* (2013.01); *C09D 125/12* (2013.01); *G02B 1/08* (2013.01); *G02B 5/3033* (2013.01); *G02B 5/3083* (2013.01); *G02F 1/13363* (2013.01); *C08J 2325/12* (2013.01)

(58) Field of Classification Search
CPC ........ C08F 212/10; C08J 5/18; C08J 2325/12; C09D 125/12; G02B 1/08; G02B 5/3033; G02B 5/3083; G02F 1/13363
USPC ............................................... 526/300
See application file for complete search history.

(56) References Cited

U.S. PATENT DOCUMENTS

| | | | | |
|---|---|---|---|---|
| 5,212,240 A | * | 5/1993 | Dion | ........... C08L 25/08 525/77 |
| 5,350,660 A | * | 9/1994 | Urano | ............ G03F 7/039 430/170 |
| 2009/0002605 A1 | | 1/2009 | Imai et al. | |

FOREIGN PATENT DOCUMENTS

| | | | |
|---|---|---|---|
| JP | 2006-030937 A | 2/2006 | |
| JP | 2006-036967 A | 2/2006 | |
| JP | 2006-241433 A | 9/2006 | |
| JP | 2009221434 | * 10/2009 | ............ C08L 101/02 |
| JP | 5203066 B2 | 6/2013 | |
| JP | 5387647 B2 | 1/2014 | |

* cited by examiner

*Primary Examiner* — Ling Choi
*Assistant Examiner* — Chun-Cheng Wang
(74) *Attorney, Agent, or Firm* — Edwards Neils LLC; Jean C. Edwards, Esq.

(57) ABSTRACT

A copolymer includes a fumaronitrile residue represented by following General Formula I and an aromatic vinyl monomer residue represented by following General Formula II:

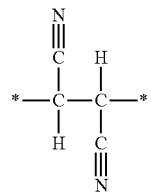

General Formula I

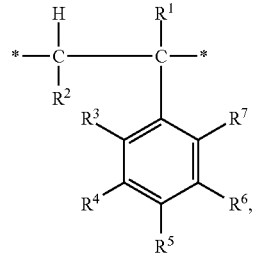

General Formula II wherein, in General-Formula II, $R^1$ is a hydrogen atom, a methyl-group or a phenyl-group, and $R^2$ is a hydrogen atom or a substituted or unsubstituted aryl-group having 6 to 12 carbon atoms, and each of $R^3$, $R^4$, $R^5$, $R^6$ and $R^7$ independently represents a hydrogen atom, a halogen atom, a hydroxy-group, an alkoxy-group having 1 to 4 carbon atoms, an acyloxy-group having 2 to 5 carbon atoms, a cyanomethyl-group, or an alkyl-group having 1 to 8 carbon atoms, and at least two of $R^2$, $R^3$ and $R^4$ may be bonded to form a ring, and at least two of arbitrary substituents of $R^3$, $R^4$, $R^5$, $R^6$ and $R^7$ may be bonded to form a ring.

10 Claims, 2 Drawing Sheets

COPOLYMER, RESIN COMPOSITION CONTAINING THE COPOLYMER, FILM AND PHASE DIFFERENCE FILM

CROSS-REFERENCE TO RELATED APPLICATIONS

The present application claims priority under 35 U.S.C. §119 to Japanese Patent Application No. 2014-211478, filed on Oct. 16, 2014. The application is hereby expressly incorporated by reference, in its entirety, into the present application.

BACKGROUND

The present disclosure relates to copolymers and resin compositions containing the copolymers preferred as a material for a phase difference film of a liquid crystal display device or the like, a film and a phase difference film.

Many kinds of optical film are used to improve display characteristics of liquid crystal display devices. For example, in an IPS (In-Plane-Switching) mode, which applies a transverse electric field to liquid crystal, a method combining a phase difference film having negative birefringence, as an optical compensation film, between a liquid crystal layer and a polarizing plate has been proposed. The phase difference film is provided, as one of means for improving color tones and viewing angles at black state. Such a phase difference film is obtainable by stretching a resin having a negative value of intrinsic birefringence. For example, a negative phase difference film obtainable by forming a film from a resin having negative intrinsic birefringence, such as fumaric acid ester resin and aromatic acyl-substituted cellulose resin, and by stretching the film has been proposed (Japanese Patent No. 5387647 (hereinafter, also referred to as "Patent Document 1") and Japanese Patent No. 5203066 (hereinafter, also referred to as "Patent Document 2")).

Japanese Patent Laid-Open Publication No. 2006-036967 (hereinafter, also referred to as "Patent Document 3") described the feature that a negative phase difference film having excellent heat resistance, transparency and mechanical characteristic is producible by using a resin composition of N-phenylmaleimide resin and styrene-based copolymer mixed together, that is, a blend polymer of N-phenylmaleimide resin and styrene-based copolymer.

SUMMARY

However, the resins described in Patent Document 1 and Patent Document 2 have small absolute values of negative intrinsic birefringence. Further, the exhibiting characteristics of performance of developing birefringence by orientation of polymer (hereinafter, also referred to as "oriented birefringence") by stretching are insufficient.

Therefore, it is difficult to obtain a phase difference film that gives a large absolute value of negative phase difference to improve the viewing angle while the phase difference film is a thin-film.

The phase difference film described in Patent Document 3 is a blend polymer, Therefore, a haze is large, and transparency is insufficient. Further, the absolute value of an obtainable phase difference while the phase difference film is a thin-film is about 137 nm at the thickness of 40 µm, which is also insufficient.

In view of the above circumstances, the present disclosure provides a copolymer that has excellent transparency and heat resistance in a thin-film, and can exhibit a large absolute value of negative oriented birefringence in the thin-film by stretching, and also a resin composition including the copolymer.

Further, the present disclosure provides a film that has excellent transparency and heat resistance and can exhibit a large absolute value of negative oriented birefringence by stretching, and also a phase difference film that has an excellent effect of improving a viewing angle in a liquid crystal display device.

In view of the above circumstances, inventors of the present disclosure have reached the present disclosure, as a result of intensive study, by finding out that a phase difference film including a specific fumaronitrile copolymer can solve the problem.

A copolymer of the present disclosure includes a fumaronitrile residue represented by following General Formula I and an aromatic vinyl monomer residue represented by following General Formula II:

General Formula I

General Formula II wherein, in General Formula II, $R^1$ is a hydrogen atom, a methyl group or a phenyl group, and $R^2$ is a hydrogen atom or a substituted or unsubstituted aryl group having 6 to 12 carbon atoms, and each of $R^3$, $R^4$, $R^5$, $R^6$ and $R^7$ independently represents a hydrogen atom, a halogen atom, a hydroxy group, an alkoxy group having 1 to 4 carbon atoms, an acyloxy group having 2 to 5 carbon atoms, a cyanomethyl group, or an alkyl group having 1 to 8 carbon atoms, and at least two of $R^2$, $R^3$ and $R^4$ may be bonded to form a ring, and at least two of arbitrary substituents of $R^3$, $R^4$, $R^5$, $R^6$ and $R^7$ may be bonded to form a ring.

It is preferable that 1e and $R^2$ are hydrogen atoms in General Formula II.

In the present specification, a numerical range represented by using the term "to" includes the values written before and after the term "to", as a lower limit value and an upper limit value of the numerical range.

It is preferable that the weight-average molecular weight of the copolymer of the present disclosure is in the range of 150,000 to 2,000,000. Further, the range of 200,000 to 1,500,000 is more preferable and the range of 300,000 to 1,500,000 is even more preferable.

In the copolymer of the present disclosure, it is preferable that a content of the fumaronitrile residue is in the range of 15 to 55 mol % when a total of the content of the fumaronitrile residue and a content of the aromatic vinyl monomer residue is 100 mol %. Further, the range of 40 to 51 mol % is more preferable It is preferable that the copolymer of the present disclosure further includes an aliphatic vinyl monomer residue represented by following General Formula III, wherein a content of aliphatic vinyl monomer residue represented by following General Formula III is in the range of 1 to 40 mol % when a total of a content of the fumaronitrile residue, a content of the aromatic vinyl monomer residue and a content of the aliphatic vinyl monomer residue is 100 mol %:

General Formula III wherein, in General Formula III, $R^8$ is a hydrogen atom or a methyl group, $R^9$ is a cyano group, an alkoxy group having 1 to 8 carbon atoms, an alkoxycarbonyl group having 1 to 12 carbon atoms, an alkylaminocarbonyl group having 1 to 8 carbon atoms, or an alkylcarbonylamino group having 1 to 8 carbon atoms.

A resin composition of the present disclosure includes the copolymer of the present disclosure.

Further, a film of the present disclosure includes the resin composition of the present disclosure. A film obtained by stretching the film of the present disclosure is preferred as a phase difference film.

The copolymer of the present disclosure includes a fumaronitrile residue represented by following General Formula I and an aromatic vinyl monomer residue represented by following General Formula II. Such a structure can provide a copolymer that has excellent transparency and heat resistance in a thin-film and can exhibit a large absolute value of negative oriented birefringence in the thin-film by stretching and also a resin composition including the copolymer.

Further, the film of the present disclosure is obtained by forming a film from the resin composition of the present disclosure. Therefore, the film has excellent transparency and heat resistance, and can exhibit a large absolute value of negative oriented birefringence by stretching. Therefore, a phase difference film that achieves an excellent effect of improving a viewing angle in a liquid crystal display device is obtainable by stretching the film of the present disclosure.

DESCRIPTION OF THE PREFERRED EMBODIMENTS

"Copolymer"

Next, copolymers and resin compositions of the present disclosure will be described in detail.

The inventors of the present disclosure investigated polymer that has excellent transparency and heat resistance in a thin-film, and can exhibit a large absolute value of negative oriented birefringence (can efficiently exhibit a negative phase difference) in the thin-film by stretching.

From the aspect of transparency, a blend polymer and a polymer including additive, such as inorganic particles (hereinafter, also referred to as "additive-addition-type polymer") are disadvantageous. Therefore, the inventors of the present disclosure tried molecular designing in a homopolymer or a copolymer. In molecular designing, the inventors of the present disclosure thought that a polymer in which a rigid structure has been introduced to a main chain is sensitive to stretch stress, compared with a polymer in which a rigid structure has not been introduced to a main chain, and therefore high orientation characteristics are expectable in the polymer in which the main chain has the rigid structure.

Meanwhile, it has been known that a polymer having a rigid structure is brittle. The brittleness is a characteristic that adversely affects a yield in production and long-term reliability of a film member, especially a member like a phase difference film used by stretching. Therefore, molecular designing that improves the brittleness is needed in polymer used in a member, such as a phase difference film.

From this aspect, the inventors of the present disclosure used fumaronitrile, which has a nitrile group at each carbon atom in a vinyl group, as a monomer that has negative birefringence and gives a rigid structure to a polymer. Further, the inventors found that a copolymer of fumaronitrile and an aromatic vinyl monomer, which is a monomer having an effect of improving the brittleness, and which has negative intrinsic birefringence, has excellent transparency and heat resistance in a thin-film and can exhibit a large absolute value of negative oriented birefringence in the thin-film by stretching.

Specifically, the copolymer of the present disclosure includes a fumaronitrile residue represented by following General Formula I and an aromatic vinyl monomer residue represented by following General Formula II:

General Formula I

General Formula II wherein, in General Formula II, $R^1$ is a hydrogen atom, a methyl group or a phenyl group, and $R^2$ is a hydrogen atom or a substituted or unsubstituted aryl group having 6 to 12 carbon atoms, and each of $R^3$, $R^4$, $R^5$, $R^6$ and $R^7$ independently represents a hydrogen atom, a halogen atom, a hydroxy group, an alkoxy group having 1 to 4 carbon atoms, an acyloxy group having 2 to 5 carbon atoms, a cyanomethyl group, or an alkyl group having 1 to 8 carbon atoms, and at least two of $R^2$, $R^3$ and $R^4$ may be bonded to form a ring, and at least two of arbitrary substituents of $R^3$, $R^4$, $R^5$, $R^6$ and $R^7$ may be bonded to form a ring.

As described above, a fumaronitrile residue represented by General Formula I has negative intrinsic birefringence, and has an effect of rigidifying a main chain of polymer and increasing sensitivity to stretch stress and an effect of providing excellent heat resistance (glass transition temperature, Tg).

In General Formula II, it is preferable that $R^1$ and $R^2$ are hydrogen atoms. As the aromatic vinyl monomer residue represented by General Formula II, the following structures (A-1 through A-30) are preferable examples. From the aspect of copolymerization characteristics with a fumaronitrile residue, A-1 and A-6 are particularly preferable:

A-1

A-2

A-3

A-4

A-5

A-6

A-7

A-8

A-9

A-10

-continued

A-11

A-12

A-13

A-14

A-15

A-16

A-17

-continued

A-18

A-19

A-20

A-21

A-22

A-23

A-24

A-25

A-26

A-27

A-28

A-29

A-30

The weight-average molecular weight of the copolymer of the present disclosure is not particularly limited, but the range of 150,000 to 2,000,000 is preferable. Further, the range of 200,000 to 1,500,000 is more preferable, and the range of 300,000 to 1,500,000 is even more preferable.

In the present disclosure, the "weight-average molecular weight (Mw)" is a weight-average molecular weight measured by gel permeation chromatography under the following conditions:

| | |
|---|---|
| Solvent | tetrahydrofurn |
| Device Name | TOSOH HLC-8320GPC |
| Column | 3 columns of TOSOH TSKgel Super HZM-H (4.6 mm × 15 cm) connected to each other is used. |
| Colum temperature | 25° C. |
| Sample Concentration | 0.1 mass % |
| Flow rate | 0.35 ml/min |
| Calibration Curve | A calibration curve obtained by using 7 samples of TSK standard polystyrene Mw = the range of 2,800,000 to 1,050 manufactured by TOSOH Corporation is used. |

In the copolymer of the present disclosure, it is preferable that the content of fumaronitrile residue is in the range of 15 to 55 mol % when a total of the content of the fumaronitrile residue and the content of aromatic vinyl monomer residue is 100 mol %. Further, the range of 40 to 51 mol % is more preferable. The combination of fumaronitrile and aromatic vinyl monomer is a combination of monomers having high alternately copolymerizing characteristics. Therefore, the possibility of obtainment of a completely alternately copolymerized material, in which fumaronitrile and aromatic vinyl monomer included in the copolymer are polymerized in such a manner that all of them are alternately arranged, is high by making the content of fumaronitrile residue close to 50 mol % when the total of the content of fumaronitrile residue and the content of aromatic vinyl monomer residue is 100 mol %. The alternately copolymerized material can effectively achieve an effect of heat resistance and orientation characteristics by introduction of fumaronitrile residue and an effect of providing flexibility and stretching characteristics, reducing Tg and the like by introduction of aromatic vinyl monomer residue.

As described above, a homopolymer of fumaronitrile is brittle, and also has high Tg. Therefore, the homopolymer of fumaronitrile is a polymer in which a stretch operation while being heated (hereinafter, also referred to as "thermal stretch") is difficult. However, when fumaronitrile is copolymerized with the aromatic vinyl monomer, and further the molecular weight is adjusted, the copolymer becomes easily thermally stretchable. Further, it is possible to excellently use the high orientation characteristics of fumaronitrile residue.

From the aspect of adjustment of Tg and the aspect of providing flexibility, it is preferable that the copolymer of the present disclosure includes aliphatic vinyl monomer residue of in the range of 1 to 40 mol % represented by following General Formula III, and that a total of the content of fumaronitrile residue, the content of aromatic vinyl monomer residue and the content of aliphatic vinyl monomer residue is 100 mol %:

General Formula III wherein, in General Formula III, $R^8$ is a hydrogen atom or a methyl group, $R^9$ is a cyano group, an alkoxy group having 1 to 8 carbon atoms, an alkoxycarbonyl group having 1 to 12 carbon atoms, an alkylaminocarbonyl group having 1 to 8 carbon atoms, or an alkylcarbonylamino group 1 to 8 carbon atoms.

As such aliphatic vinyl monomer residue, a so-called general-purpose vinyl monomer may be used (a monomer having at least one vinyl group is widely used). It is preferable that the general-purpose vinyl monomer is selected based on characteristics to be given to a copolymer including a fumaronitrile residue and an aromatic vinyl monomer residue. When a general-purpose vinyl monomer residue is preferably selected, and included as a monomer component (a copolymerized monomer) other than fumaronitrile included in the copolymer, it is possible to perform fine adjustment of heat resistance (glass transition temperature, Tg) and to provide appropriate flexibility.

As aliphatic vinyl monomer residue represented by General Formula III, the following structures (C-1 through C-18) are preferable examples. From the aspect of copolymerization characteristics with fumaronitrile residue and aromatic vinyl residue, C-1, C-2, C-3, C-4, C-9 and C-15 are particularly preferable:

C-1

C-2

C-3

C-4

C-5

C-6

C-7

C-8

-continued

C-9

C-10

C-11

C-12

C-13

C-14

C-15

C-16

C-17

C-18

As general-purpose resin, which is widely used, styrene acrylonitrile copolymer (hereinafter, also referred to as "AS resin") is known. This copolymer has negative birefringence, but the absolute value of the birefringence is insufficient. Further, the value of oriented birefringence achievable by stretching is insufficient.

Fumaronitrile has a structure in which a nitrile group is introduced also to carbon that does not have a nitrile group in a vinyl group of acrylonitrile. This introduction of a nitrile group to carbon introduces a rigid structure to a main chain. However, it is generally known that fumaronitrile is brittle and that Tg of fumaronitrile is high. Therefore, fumaronitrile has been considered to be inappropriate, as material for film that is used after being thermally stretched.

The inventors of the present disclosure overturned such common technical knowledge, and found that fumaronitrile is useful as optical film material, especially as film material having negative birefringence, by preferable selection of a monomer component (a copolymerized monomer) other than fumaronitrile included in the copolymer, adjustment of the molecular weight and the like. Further, an obtained copolymer of fumaronitrile and styrene (please refer to examples that will be described later) has an extremely high Tg (higher by about 100° C.), compared with AS resin. Further, the copolymer exhibited efficient introduction of rigidification of a main chain, which was intended by the inventors of the present disclosure in molecular designing. So far, regarding copolymer including fumaronitrile residue, there was no example of obtaining a copolymer appropriate for practical use from the aspect of brittleness and Tg as described above. In such copolymer, a large absolute value of negative birefringence and the characteristics of a large absolute value of oriented birefringence that were not achievable so far have been achieved for the first time. Such an effect greatly exceeds expectable birefringence and oriented birefringence of the fumaronitrile copolymer of the present disclosure, which are expected, for example, from AS resin or the like.

The reason for achievement of such a remarkably excellent effect is not sure. However, it is conceivable that high-density arrangement of highly polarized nitrile groups at a main chain of the polymer efficiently rigidifies the main chain, and provides excellent heat resistance. It is conceivable that resin having such rigid main chain structure is easily plane-oriented in a drying step of solvent casting, and therefore, a negative phase difference in the thickness direction of a film is efficiently exhibited. Further, the resin is sensitive to stress during stretching. Therefore, it is inferable that the resin alone can efficiently exhibit a negative phase difference in the in-plane/thickness directions, and transparency and a large absolute value of negative phase difference are achievable.

As described above, the copolymer of the present disclosure has excellent transparency and heat resistance in a thin-film, and can exhibit a large absolute value of negative oriented birefringence in the thin-film by stretching.

"Resin Composition"

Next, a resin composition of the present disclosure will be described.

The resin composition of the present disclosure includes the copolymer of the present disclosure. The copolymer of the present disclosure included in the resin composition of the present disclosure may be only one kind of copolymer. Alternatively, two or more kinds of copolymer of the present disclosure may be mixed together and used in the resin composition.

The resin composition of the present disclosure is preferred as a pellet and a dope composition used to form a film member, such as a phase difference film, and especially as a dope composition for solvent casting. When the resin composition of the present disclosure is used as a dope composition, it is preferable that the resin composition includes an organic solvent into which the copolymer of the present disclosure is dissolvable in such a manner that the resin composition has a viscosity appropriate for the film formation method. Such organic solvent is methylene chloride, methanol, butanol, acetone, 2-butanone, tetrahydrofuran, dimethylacetamide, 1-methyl-2-pyrrolidone and the like.

In the resin composition of the present disclosure, the content of the copolymer of the present disclosure is not particularly limited. However, when the resin composition is used as a dope composition, it is preferable that the resin composition includes the copolymer at the range of 10 to 60 mass % of the whole resin composition. It is more preferable that the resin composition includes the copolymer at the range of 13 to 50 mass %. It is even more preferable that the resin composition includes the copolymer at the range of 15 to 40 mass %.

At least one kind of plasticizer, ultraviolet ray absorber, antioxidant, brittleness modifier, optical characteristics exhibiting agent and the like, as an additive, may be added to the resin composition of the present disclosure as long as the additive does not damage the effect of the present disclosure.

The plasticizer has a function of improving the fluidity and the flexibility of the dope composition. Further, a compound that prevents oxidization of the resin composition of the present disclosure may be preferably added, as the antioxidant. Especially, phenol-based antioxidant containing a vinyl group, which can capture alkyl radicals generated in an early period of automatic oxidization of resin, is preferred. For example, SUMILIZER GM and SUMILIZER GS manufactured by Sumitomo Chemical Co., Ltd. and the like may be used. The antioxidant of the compound represented by General Formula I is a mechanism that acts to capture or decompose peroxide radicals generated in a middle period through a last period of automatic oxidization of resin. Therefore, an effect is expectable by adding antioxidant appropriate for each period.

The resin composition of the present disclosure includes the copolymer of the present disclosure. Therefore, the resin composition has excellent transparency and heat resistance in a thin-film, and can exhibit a large absolute value of negative oriented birefringence in the thin-film by stretching.

<Film Formed from Resin Composition>

A film of the present disclosure is formed by using the resin composition of the present disclosure. Therefore, the film has excellent transparency and heat resistance, and can exhibit a large absolute value of negative oriented birefringence by stretching. The film is preferred as a phase difference film of an image display device, such as a liquid crystal display device.

The film formed by using the resin composition of the present disclosure may include an additional structure based on the use of the film. Such a structure is a surface treatment applied to the surface of the film, a function layer provided on the surface of the film and the like. An example of the function layer is a functional layer described in detail in Japan Institute of Invention and Innovation, Journal of Technical Disclosure (Journal of Technical Disclosure, No. 2001-1745, published on Mar. 15, 2001, Japan Institute of Invention and Innovation) pp. 32 through 45.

The film of the present disclosure is a film formed by using the resin composition of the present disclosure. The film of the present disclosure is a film of the copolymer (fumaronitrile copolymer) of the present disclosure. It is preferable that the film of the present disclosure includes 50 mass % or higher of fumaronitrile copolymer. Further, 80 mass % or higher is more preferable, and 95% or higher is even more preferable.

A method for producing the film of the present disclosure is not particularly limited. However, it is preferable that the film is produced by using a solvent casting method as will be described next.

<Solvent Casting Method>

A preferable embodiment in production of the film of the present disclosure by using a solvent casting method will be described. In the solvent casting method, the dope composition of the present disclosure is prepared, and a film is formed by casting the dope composition onto a surface of a metal support member like stainless steel band.

As a method and equipment for producing the film of the present disclosure, a conventional solvent casting method and a conventional apparatus for a solvent casting method may be used. Dope composition prepared in a dissolving machine (pot) is temporarily stored in a storage pot to perform final preparation by removing bubbles included in the dope. The dope is sent from an outlet for ejecting dope, for example, to a pressure-type die through a pressure-type metering gear pump that can send a constant amount of liquid based on a rotation speed at high accuracy. The dope is evenly casted from a lip opening (slit) of the pressure-type die onto a metal support member of a casting unit that is endlessly running. At a peeling point when the metal support member has made almost one rotation, a half-dried dope coating (which is also referred to as a web) is peeled from the metal support member. Both ends of the obtained web are held by clips, and the web is dried by being delivered by tenter clips while the width of the web is maintained. Then, the web is delivered by a roll group of a dry apparatus, and drying ends, and the web having a predetermined length is wound by a winding machine. The combination of the tenter apparatus and the roll group of the drying apparatus differs depending on the purpose of a film. In a solvent casting method used for a silver halide photographic sensitive material and a functional protective coating for an electronic display, a coating apparatus for processing a surface of a film, such as an undercoat layer, an antistatic layer, an anti-halation layer and a protective layer, is often provided in addition to the solvent casting apparatus. Each of these production steps is described in detail in Japan Institute of Invention and Innovation, Journal of Technical Disclosure (Journal of Technical Disclosure, No. 2001-1745, published on Mar. 15, 2001, Japan Institute of Invention and Innovation) pp. 25 through 30. The steps are classified into casting (including co-casting), a metal support member, drying, peeling, stretching and the like.

<Melt-film Forming Method >

A preferable embodiment in production of the film of the present disclosure by using a melt-film forming method will be described. In the melt-film forming method, the resin composition of the present disclosure is pelletized, and a film is formed by using a melting extrusion machine.

It is preferable to use pelletized fumaronitrile copolymer, as material for forming a film of fumaronitrile copolymer of the present disclosure. Pelletized resin composition is kneaded and melted, and the molten resin is sent through a gear pump to remove pulsation of an extrusion machine. After then, filtering by a metal mesh filter or the like is performed, and the resin is extruded in sheet shape from a T-shaped die attached to the back side of the metal mesh filter or the like onto a cooling drum. Extrusion may be performed through a single layer. Alternatively, extrusion may be performed through plural layers by using a multi-manifold die or a field block die. After then, the resin is extruded onto a casting drum. The resin is peeled from the casting drum, and wound after being sent through a nip roll.

<Stretching Process>

Stretching process may be further performed on the film of the present disclosure obtained by film formation.

Stretching process may be performed on-line during film formation step. Alternatively, stretching process may be performed off-line after completing film formation and wounding the film once. Specifically, in melt-film forming, stretching may be performed before cooling is completed during film formation, or after cooling is completed.

It is preferable that stretching is performed by thermal stretching at the range of (Tg−60° C.) to (Tg+50° C.). Further, the range of (Tg−50° C.) to (Tg+30° C.) is more preferable, and the range of (Tg−40° C.) to (Tg+20° C.) is particularly preferable. It is preferable that a stretching ratio is in the range of 0.1% to 500%. Further, the range of 10% to 300% is more preferable, and the range of 30% to 200% is particularly preferable. These kinds of stretching may be performed by one stage, or by multiple stages. The stretching ratio used in this specification is obtained by using the following expression:

$$\text{Stretching Ratio (\%)} = 100 \times \{(\text{Length after Stretching}) - (\text{Length before Stretching})\}/\text{Length before Stretching}.$$

Such stretching is performed by longitudinal stretching, transverse stretching or a combination of them. Longitudinal stretching may adopt (1) roll stretching (stretching a film in a longitudinal direction by using at least two pairs of nip rolls in which the rotation speed is faster at the exit side), (2) fixed end stretching (stretching a film in a longitudinal direction by holding both ends of the film, and by delivering the film gradually faster in the longitudinal direction) and the like. Meanwhile, transverse stretching may adopt tenter stretching (stretching a film by holding both ends of a film by chucks, and by widening the film in the transverse direction (a direction at a right angle to the longitudinal direction)) and the like. These longitudinal stretching and transverse stretching may be performed each alone (uniaxial stretching) or in combination (biaxial stretching). When biaxial stretch is adopted, longitudinal stretching and transverse stretching may be performed sequentially (sequential stretching) or simultaneously (simultaneous stretching).

It is preferable that the stretch speed of longitudinal stretching and transverse stretching is in the range of 10%/min to 10,000%/min. Further, the range of 20%/min to 1,000%/min is more preferable, and the range of 30%/min to 800%/min is particularly preferable. A stretch speed in multistage stretching is indicated by an average of stretch speeds in the stages.

After such stretching, it is also preferable that relaxation is performed in the longitudinal or transverse direction by the range of 0% to 10%. Further, it is also preferable that after such stretching, heat fixation at the range of 150° C. to 250° C. is performed for the range of 1 second to 3 minutes.

It is preferable that the thickness of the film after stretching in this manner is in the range of 10 μm to 300 μm. Further, the range of 20 μm to 200 μm is more preferable, and the range of 30 μm to 100 μm is particularly preferable.

When the film of the present disclosure is used as a phase difference film, it is preferable that angle θ between a film formation direction (a longitudinal direction) and a slow phase axis of an in-plane phase difference (retardation, Re) of the film is as close to 0°, +90° or −90° as possible. Specifically, in longitudinal stretching, it is preferable that the angle is as close to 0° as possible. It is preferable that the angle is 0±3°. Further, 0±2° is more preferable, and 0±1° is particularly preferable. In transverse stretching, 90±3° or −90±3° is preferable, and 90±2° or −90±2° is more preferable, and 90±1° or −90±1° is particularly preferable.

When Re is induced by tension applied to the film in the longitudinal direction of the film during casting through peeling, it is possible to make Re close to 0 by stretching the film in the width direction of the film by tenter apparatus. In this case, it is preferable that a stretch ratio is in the range of 0.1% to 20%. Further, the range of 0.5% to 10% is more preferable, and the range of 1% to 5% is particularly preferable.

Stretching process may be performed at some time in the film formation step. Alternatively, stretching process may be performed on a roll of raw film obtained by performing film formation and winding. In the former case, stretching may be performed in a state including a residual solvent. It is possible to stretch the film in a preferable manner when the amount of residual solvent is in the range of 2 to 30 mass %.

The thickness of a film obtained after drying differs depending on the purpose of use of the film. It is preferable that the thickness of the film is in the range of 5 to 500 μm. Further, the range of 20 to 300 μm is more preferable, and the range of 30 to 150 μm is even more preferable. Further, when the film is used for an optical device, and especially for a VA liquid crystal display device, it is preferable that the thickness of the film is in the range of 40 to 110 μm. The thickness of the film should be adjusted to a preferable thickness by adjusting the concentration of a solid content included in a dope, a slit gap of a lip opening of a die, an extrusion pressure from the die, the speed of a metal support member and the like.

The film of the present disclosure may be formed in an elongated shape. For example, the film may be produced as an elongated wound film having a width in the range of 0.5 to 3 m (the range of 0.6 to 2.5 m is preferable, and the range of 0.8 to 2.2 m is more preferable) and a length in the range of 100 to 10,000 m per roll (the range of 500 to 7,000 m is preferable, and the range of 1,000 to 6,000 m is more preferable). When the film is wound, it is preferable to provide a knurling at at least one end of the film. It is preferable that the width of the knurling is in the range of 3 mm to 50 mm. Further, the range of 5 mm to 30 mm is more preferable. It is preferable that the height of the knurling is in the range of 0.5 to 500 μm Further, the range of 1 to 200 μm is more preferable. The knurling may be provided by pressing the film from one surface or both surfaces of the film.

It is possible to improve adhesion of a film before stretching or a film after stretching to each function layer (for example, a base coat layer and a back layer) by performing surface treatment, if necessary. For example, glow discharge treatment, ultraviolet ray radiation treatment, corona treatment, flame treatment and acid or alkali treatment may be adopted.

The unstretched film or stretched film may be used alone or in combination with a polarizing plate. Further, the unstretched film or stretched film may be used by providing a liquid crystal layer, a refractive-index controlled layer (low reflection layer) or a hard coat layer on the film.

The film of the present disclosure is obtained by forming the film from the resin composition of the present disclosure. Therefore, the film has excellent transparency and heat resistance, and can exhibit a large absolute value of negative oriented birefringence by stretching. Hence, it is possible to obtain a phase difference film that has an excellent effect of improving a viewing angle at a liquid crystal display device by stretching the film of the present disclosure.

"Phase Difference Film, Polarizing Plate and Liquid Crystal Display Device"

Next, an embodiment of a phase difference film of the present disclosure obtained by forming a film from the resin composition of the present disclosure, a polarizing plate of the present disclosure including the phase difference film and a liquid crystal display device will be described in detail with reference to drawings. In the drawings attached to this specification, the scale of each unit is appropriately modified to make them easily recognizable.

Figure 1:
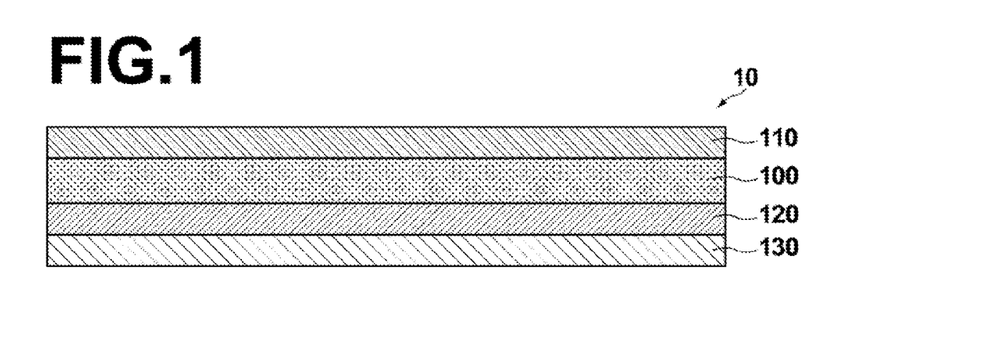
FIG. 1 is a schematic cross section illustrating the structure of a phase difference film and a polarizing plate according to an embodiment of the present disclosure.

A polarizing plate 10 including a phase difference film 130 according to an embodiment of the present disclosure will be described with reference to drawings. FIG. 1 is a schematic diagram illustrating the structure of the polarizing plate 10 according to an embodiment of the present disclosure. In the drawings attached to the present specification, the scale of each unit is appropriately modified to make them easily recognizable.

As illustrated in FIG. 1, the polarizing plate 10 includes a polarizing plate protection film 110 on a viewing-side surface of a polarizer 100 and a polarizing plate protection film 120 on a liquid-crystal-cell-side surface of the polarizer 100. Further, a phase difference film 130 according to the present disclosure is provided on a liquid-crystal-cell-side surface of the polarizing plate protection film 120.

The polarizer 100 is not particularly limited, but the polarizer 100 may be produced by immersing a polyvinyl alcohol film in a solution of iodine and by stretching the film. The polarizing plate protection film is a protection film for suppressing a deterioration of the polarizer 100. It is preferable that the polarizing plate protection film has low moisture permeability.

The phase difference film 130 is obtained by stretching the film of the present disclosure. As described above, the film of the present disclosure can exhibit a large absolute value of negative oriented birefringence by stretching. Therefore, it is possible to incorporate the phase difference film 130 obtained by stretching the film of the present disclosure into a liquid crystal display device in a preferable manner. The phase difference film 130 has an excellent effect of improving a viewing angle in a liquid crystal display device. The liquid crystal display device is a display device of TN (Twisted Nematic) type, IPS (In-Plane Switching) type, FLC (Ferroelectric Liquid Crystal) type, AFLC (Anti FLC, antiferroelectric liquid crystal) type, OCB (Optically Compensated Birefringence) type, STN (Super TN) type, ECB (Electrically Controlled Birefringence) type, VA (Vertically Aligned) type, HAN (Hybrid Aligned Nematic) type or the like, and the IPS type is preferable. Further, the phase difference film 130 is usable in a preferable manner in a liquid crystal display device of any of a transmission type, a reflection type and a semi-transmission type. The polarizing plate 10 may be produced by using a production method, for example, with reference to Japanese Patent Laid-Open Publication No. 2006-241433.

Figure 2:
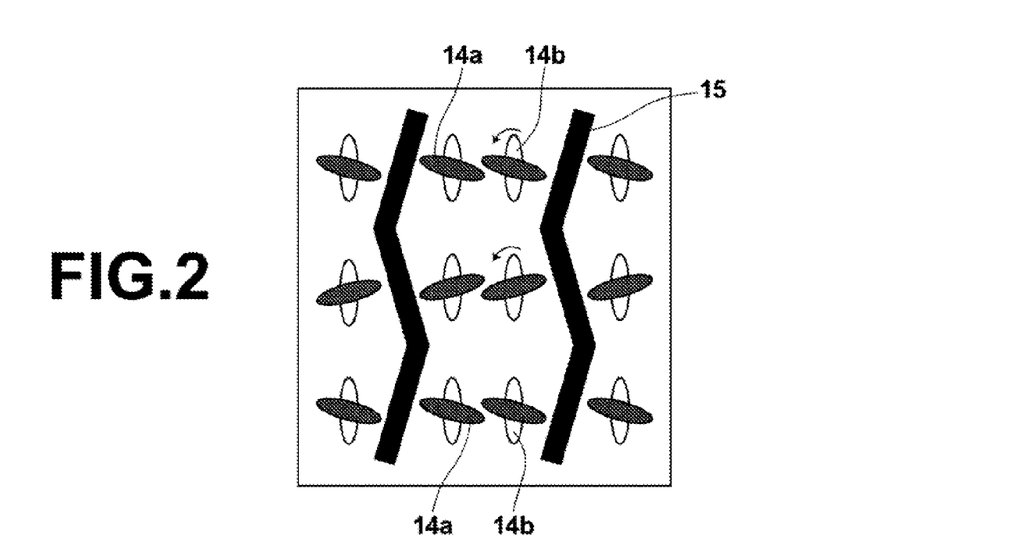
FIG. 2 is a schematic top view illustrating a part of pixel electrodes on an inner surface of a substrate in an IPS type liquid crystal cell.
Figure 3:
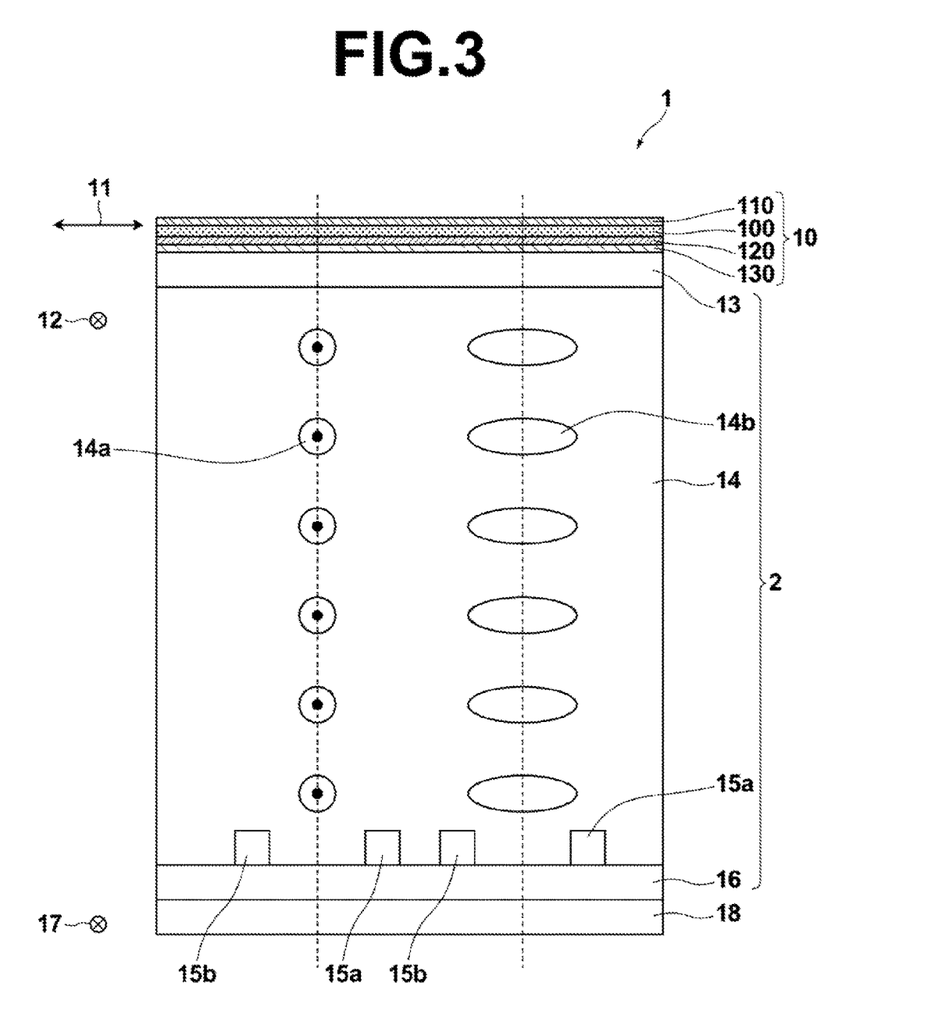
FIG. 3 is a schematic cross section illustrating the configuration of an IPS type liquid crystal display device including a polarizing plate according to an embodiment of the present disclosure.

FIG. 2 is a schematic top view illustrating a part of pixel electrodes on an inner surface of a substrate in an IPS type liquid crystal cell. FIG. 3 is a schematic cross section illustrating the configuration of an IPS type liquid crystal display device 1 including the polarizing plate 10 according to an embodiment of the present disclosure.

The IPS type liquid crystal cell is in a mode in which liquid crystal molecules 14a and 14b constantly rotate within a surface of the substrate, as illustrated in FIG. 2. A transverse electric field is applied by arranging pixel electrodes 15 only on a substrate located in one direction. In the IPS type, liquid crystal molecules do not rise obliquely. Therefore, a relatively wide viewing angle is achievable. However, when a display is viewed from a direction away from the direction of a normal to the substrate, it is impossible to prevent narrowing of the viewing angle caused by leakage of light. The phase difference film 130 of the present embodiment is preferred as a phase difference film that compensates such narrowing.

When the phase difference film 130 is used in a liquid crystal display device, it is preferable to arrange the phase difference film 130 between a liquid crystal cell and a viewing-side polarizing plate or a back-light-side polarizing plate. Further, the phase difference film 130 may function also as a protection film of the viewing-side polarizing plate or the back-light-side polarizing plate. The phase difference film 130 may be incorporated into a liquid crystal display device as a member of the polarizing plate, and arranged between a liquid crystal cell and a polarizer.

When the phase difference film 130 is used for optical compensation of a liquid crystal cell in IPS mode (especially, reduction of color shift in an oblique direction at black state), the phase difference film 130 may be used in combination with a positive A plate.

The liquid crystal display device 1 illustrated in FIG. 3 is an example in which the phase difference film 130 of the present embodiment is provided in an IPS type liquid crystal device of transmission type. FIG. 3 illustrates a mode in which the phase difference film 130 is provided on a liquid-crystal-cell-side surface of the viewing-side polarizing plate. The liquid crystal device 1 includes a pair of polarizing plates (the upper polarizing plate 10 and a lower polarizing plate 18) and a liquid crystal cell 2 sandwiched between the pair of polarizing plates. The liquid crystal cell 2 includes a liquid crystal layer 14 and a liquid crystal cell upper substrate 13 and a liquid crystal cell lower substrate 16 arranged above the liquid crystal layer 14 and below the liquid crystal layer 14, respectively. The liquid crystal cell lower substrate 16 includes transparent pixel electrodes 15a and 15b. Further, this mode includes a back light unit under the lower polarizing plate 18 and a color filter between the liquid crystal layer 14 and the viewing-side polarizing plate (upper polarizing plate) 10, which are not illustrated.

Liquid crystal molecules 14a on the left side of FIG. 3 are in a state when voltage is OFF. Liquid crystal molecules 14b on the right side of FIG. 3 are in a state when voltage is ON. When voltage is ON, voltage is applied between transparent pixel electrodes 15a and 15b, and an electric field is generated. Then, the liquid crystal molecules 14a rotate almost simultaneously in an approximately horizontal direction with respect to a surface of the substrate, and become a state on the right side of FIG. 3. In FIG. 3, an absorption axis 17 of the back-light-side polarizing plate 18 and an absorption axis 11 of the viewing-side polarizing plate 10 are almost orthogonal to each other. When voltage is OFF, the direction 12 of the optical axis of liquid crystal molecules is almost parallel to the direction of the absorption axis 17 of the viewing-side polarizing plate 10.

In the liquid crystal display device 1, at least one of the pair of polarizing plates (10 and 18) is a polarizing plate of the present disclosure, which includes a polarizer and a polarizing plate protection film of the present disclosure on at least one of surfaces of the polarizer.

In the present embodiment, it is preferable that no phase difference layer other than the phase difference film 130 is present between the viewing-side polarizing plate and the back-light-side polarizing plate. Therefore, it is preferable to use, as polarizing plate protection films 110 and 120, isotropic polymer films having both in-plane phase difference Re and film thickness direction phase difference Rth that are close to 0. As such a polymer film, a cellulose acylate film disclosed in Japanese Patent Laid-Open Publication No. 2006-030937 or the like is preferable.

The phase difference film 130 is obtained by stretching a film obtained by forming a film from the resin composition of the present disclosure. Therefore, the phase difference film 130 has excellent transparency and heat resistance and a large absolute value of negative oriented birefringence. When the phase difference film 130 is provided in the liquid crystal display device 1, it is possible to achieve an excellent effect of improving a viewing angle.

"Design Modification"

In the above embodiments, a mode of the phase difference film 130 provided in the polarizing plate was described. The phase difference film 130 may be used in combination with another functional layer described in detail in Japan Institute of Invention and Innovation, Journal of Technical Disclosure (Journal of Technical Disclosure, No. 2001-1745, published on Mar. 15, 2001, Japan Institute of Invention and Innovation) pp. 32 through 45. The phase difference film 130 is preferably usable in a mode in which an optical anisotropic layer is provided (an optical compensation film) and a mode in which an anti-reflection layer is provided, besides the mode in which the phase difference film 130 is provided in the polarizing plate.

EXAMPLES

Next, the present disclosure will be specifically described based on examples. Material, reagent, an amount of substance and its ratio, an operation and the like described in the following examples may be appropriately modified without departing from the spirit of the present disclosure. Therefore, the present disclosure is not limited to the following examples nor restricted by the following examples.

Synthesis Example 1

Synthesis of P-9

20.0 g of dimethylacetamide was put in a 2 L three-neck flask including a thermometer, a stirrer, and a reflux tube, and stirred at 85° C. to prepare a dimethylacetamide solution. Separately, 50.0 g of fumaronitrile (following B-1), 66.7 g of styrene (aforementioned A-1 compound), 0.15 g of dimethyl 2,2'-azobis isobutyrate and 96.7 g of dimethylacetamide were put in a 300 mL Erlenmeyer flask, and a monomer composition was prepared by stirring to dissolve these substances.

B-1

Next, the monomer composition was dropped at a speed of 1.8 mL/min into the dimethylacetamide solution as described above with a chemical pump to prepare a mixture.

Then, the mixture was further reacted at 85° C. for four hours by stirred. After the reaction, the mixture was cooled to room temperature and diluted with 500 mL of acetone. Then, white precipitation was obtained by reprecipitation with 5 L of methanol. After the obtained white precipitation was filtered out from the mixture, a step of redispersing and washing the white precipitation with 2 L of methanol and filtering out the white precipitation again was repeated three times. The obtained precipitation was dried at 60° C. through the night. As a result, 75.0 g of P-9 was obtained.

Synthesis Example 2

Synthesis of P-1 through P-8, P-10 and Comparative Compound HP-1

P-1 through P-8, P-10 and HP-1 were obtained by appropriately modifying corresponding monomer species, a ratio of components in a mixture and an amount of polymerization initiator in the Synthesis Example 1. Corresponding monomer species are shown in Table 1. In Table 1, a structure described as repeating unit 2 is indicated by the number of the compound illustrated as aromatic vinyl monomer. Further, a structure described as repeating unit 3 is indicated by the number of the compound illustrated as aliphatic vinyl monomer. Further, structures D-1 and D-2 of repeating unit 1 are as follows:

Synthesis Example 3

Synthesis of P-13

20.0 g of methyl ethyl ketone was put in a 2 L three-neck flask including a thermometer, a stirrer, and a reflux tube, and stirred at 85° C. to prepare a methyl ethyl ketone solution. Separately, 39.0 g of fumaronitrile, 104.0 g of styrene, 50.0 g of methyl methacrylate, 0.23 g of dimethyl 2,2'-azobis isobutyrate and 200 g of methyl ethyl ketone were put in a 300 mL Erlenmeyer flask, and a monomer composition was prepared by stirring to dissolve these substances.

Next, the monomer composition was dropped at a speed of 0.7 mL/min into the methyl ethyl ketone solution as described above with a chemical pump to prepare a mixture. Then, the mixture was was further reacted at 85° C. for two hours by stirred. After the reaction, the mixture was cooled to room temperature and diluted with 500 mL of acetone. Then, white precipitation was obtained by reprecipitation with 5 L of methanol. After the obtained white precipitation was filtered out from the mixture, a step of redispersing and washing the white precipitation with 2 L of methanol and filtering out the white precipitation again was repeated three times. The obtained precipitation was dried at 60° C. through the night. As a result, 114.0 g of P-13 was obtained.

Synthesis Example 4

P-11, P-12 and P-14 through P-17

P-11, P-12 and P-14 through P-17 were obtained by appropriately modifying corresponding monomer species, a ratio of components in a preparation and an amount of polymerization initiator in the Synthesis Example 3.

Synthesis Example 5

Synthesis of Comparative Compound HP-2

40.0 g of diisopropyl fumarate, 0.23 g of dimethyl 2,2'-azobis isobutyrate and 30.4 g of methyl ethyl ketone were put in a 500 mL three-neck flask including a thermometer, a stirrer, and a reflux tube, and reacted at 85° C. for six hours. After the reaction, the mixture was cooled to room temperature and diluted with 100 mL of acetone. Then white precipitation was obtained by reprecipitation with 1 L of methanol. After the obtained white precipitation was filtered out from the mixture, a step of redispersing and washing the white precipitation with 500 mL of methanol and filtering out the white precipitation again was repeated three times. The obtained precipitation was dried at 60° C. through the night. As a result, 20.0 g of Comparative Compound HP-2 was obtained.

Preparation Example 1

Preparation of Comparative Compound HP-3

20 g of polystyrene (PSJ-polystyrene GPPS G9305, manufactured by PS Japan Corporation), 20 g of Comparative Compound HP-2 and 360 g of methylene chloride were put in a 1 L eggplant-shaped flask including a stirrer, and stirred at room temperature until the substances were completely dissolved to prepare a mixture. The mixture was condensed by using a rotary evaporator. The obtained white solid was dried at 60° C. through the night. As a result, 40 g of Comparative Compound HP-3 was obtained.

<Evaluation>

Regarding each obtained resin or resin composition, Table 1 shows composition ratios of a fumaronitrile residue and styrene residue obtained by $^1$H NMR measurement, the value of glass transition temperature Tg measured in accordance with JIS K-7121 and a weight-average molecular weight obtained by Gel Permeation Chromatography (GPC). In $^1$H NMR measurement, a nuclear magnetic resonance spectrum measurement apparatus (ARX-300) manufactured by BRUKER corporation was used. In measurement of Tg, a Differential Scanning calorimetry analysis apparatus (X-DSC7000) manufactured by Seiko Instruments Inc. (SII) was used. In GPC, a GPC apparatus (HLC-8320GPC, Eco-SEC) manufactured by TOSOH Corporation was used.

Examples 1 Through 7, Comparative Examples 1 Through 6

<Dope Preparation Step: Preparation of Dope Composition>

Each dope composition was prepared by pouring the following materials into a mixing tank and stirring them while heating to dissolve them:

100 parts by mass of resin with a resin number shown in Table 2; and 400 parts by mass of 2-butanone.

<Casting Step>

Each of the above dope compositions was uniformly casted, with a width of 2000 mm, from a casting die onto a stainless steel endless band (a casting support member), and a casting film was formed.

<Production of Film Sample>

500 parts by mass of the above dope composition was casted by using a band casting machine. A film having a residual solvent amount of 15 mass % was dried under a condition of 140° C., and unstretched films of Examples 1 through 3 and Comparative Examples 1 through 3 were obtained. Further, films of Examples 4 through 7 and Comparative Examples 4 through 6 were respectively produced by transverse uniaxial stretching in the width direction at stretching temperatures and stretching ratios shown in Table 2 with tenter apparatus, if necessary. Hereinafter, the thickness of all of produced films is 40 μm, unless otherwise mentioned.

Examples 8 and 9 and Comparative Examples 7 and 8

<Pelletizing Step: Preparation of Dope Composition>

The following materials were poured into a melting kneading tank, and kneaded at the temperature of Tg+80° C. After then, each pellet was prepared by pelletizing the kneaded materials by a pelletizer:

100 parts by mass of resin with a resin number shown in Table 3; and 0.5 part by mass of IRGANOX 1010 (manufactured by BASF), as antioxidant.

<Film Formation Step>

The pellets were put in an extruder. The molten materials were uniformly extruded, with a width of 2000 mm, from a T-die onto a stainless steel cooling role, and unstretched films shown in Table 3 were formed. Films of Examples 8 and 9 and Comparative Examples 7 and 8 were produced by transverse uniaxial stretching in the width direction by using tenter apparatus at stretching temperatures and stretching ratios shown in Table 3, if necessary. Hereinafter, the thickness of all of produced films is 40 μm, unless otherwise mentioned.

<Evaluation of Film Sample>

[Retardation]

Regarding evaluation of a film sample, a part (120 mm×120 mm) of each of the obtained film samples was prepared. Regarding a retardation value (Re value), an Re value at a wavelength of 590 nm at 25° C. 60% RH was measured by using "KOBRA 21ADH" (manufactured by Oji Scientific Instruments Co.). Measurement was performed based on a stretching direction in which a slow phase axis is exhibited in the film sample having a positive intrinsic birefringence.

Further, Rth at a wavelength of 590 nm at 25° C. 80% RH was measured. The results are shown in the following Table 2 and Table 3. The Re value and the Rth value shown in Table 2 and Table 3 are converted values for the film thickness of 10 μm (indicated by *1). In Table 2, the sign of *2 indicates that measurement was impossible because a haze was too large.

[Haze]

Measurement of a haze was performed on a film sample of 40 mm×80 mm cut out from each of the obtained film samples at 25° C. and a relative humidity of 60%. The measurement was performed by using a haze meter "HGM-2DP" manufactured by Suga Test Instruments Co., Ltd. in accordance with JIS K-6714. The result is shown in Table 2.

The results in Table 2 and Table 3 show that fumaronitrile copolymer films in the examples of the present disclosure have negative values of Rth having large absolute values also in Examples 1 through 3, in which the films are not stretched. Further, films after stretching (Examples 4 through 7 in Table 2 and Example 9 in Table 3) exhibit a large oriented birefringence, and both of the Re value and the Rth value are negative values having large absolute values.

Comparative Examples 1 and 7 are examples of styrene acrylonitrile copolymer resin films. Comparative Example 2 is an example of a fumaric diester resin film. Comparative Example 3 is an example of a polyethylene film. Comparative Examples 4 and 8 are examples of films obtained by stretching the film of Relative Example 1. Comparative Example 6 is an example of a film obtained by stretching the film of Relative Example 2.

Table 2 and Table 3 show that all of the comparative examples have remarkably smaller absolute values of oriented birefringence, compared with the examples. As described, the effectiveness of the present disclosure was confirmed.

TABLE 1

| RESIN NUMBER | REPEATING UNIT 1 | | REPEATING UNIT 2 | | REPEATING UNIT 3 | | Tg [° C.] | Mw [—] |
|---|---|---|---|---|---|---|---|---|
| | STRUCTURE | [mol %] | STRUCTURE | [mol %] | STRUCTURE | [mol %] | | |
| P-1 | B-1 | 10 | A-1 | 90 | — | — | 147 | 176,000 |
| P-2 | B-1 | 75 | A-2 | 25 | — | — | 214 | 478,000 |
| P-3 | B-1 | 25 | A-1 | 75 | — | — | 171 | 358,000 |
| P-4 | B-1 | 50 | A-1 | 50 | — | — | 195 | 140,000 |
| P-5 | B-1 | 50 | A-1 | 50 | — | — | 197 | 1,600,000 |
| P-6 | B-1 | 50 | A-1 | 50 | — | — | 195 | 170,000 |
| P-7 | B-1 | 50 | A-1 | 50 | — | — | 195 | 270,000 |
| P-8 | B-1 | 50 | A-1 | 50 | — | — | 196 | 1,200,000 |
| P-9 | B-1 | 50 | A-1 | 50 | — | — | 196 | 357,000 |
| P-10 | B-1 | 50 | A-6 | 50 | — | — | 208 | 235,000 |
| P-11 | B-1 | 49 | A-1 | 50 | C-4 | 1 | 190 | 746,000 |
| P-12 | B-1 | 15 | A-2 | 50 | C-4 | 35 | 141 | 434,000 |
| P-13 | B-1 | 25 | A-1 | 50 | C-2 | 25 | 157 | 395,000 |

TABLE 1-continued

| RESIN NUMBER | REPEATING UNIT 1 STRUCTURE | [mol %] | REPEATING UNIT 2 STRUCTURE | [mol %] | REPEATING UNIT 3 STRUCTURE | [mol %] | Tg [° C.] | Mw [—] |
|---|---|---|---|---|---|---|---|---|
| P-14 | B-1 | 49 | A-1 | 50 | C-3 | 1 | 190 | 839,000 |
| P-15 | B-1 | 45 | A-1 | 50 | C-3 | 5 | 185 | 604,000 |
| P-16 | B-1 | 49 | A-1 | 50 | C-15 | 1 | 187 | 871,000 |
| P-17 | B-1 | 49 | A-1 | 40 | C-15 | 11 | 201 | 725,000 |
| HP-1 | D-1 | 50 | A-1 | 50 | — | — | 98 | 120,000 |
| HP-2 | D-2 | 100 | — | — | — | — | 70 | 249,000 |

TABLE 2

| | RESIN NUMBER | STRETCH TEMPERATURE [° C.] | STRETCH RATIO [%] | HAZE [%] | Re*1 [nm] | Rth*1 [nm] |
|---|---|---|---|---|---|---|
| EXAMPLE 1 | P-9 | — | — | 0.3 | −1 | −29 |
| EXAMPLE 2 | P-10 | — | — | 0.8 | −1 | −69 |
| EXAMPLE 3 | P-15 | — | — | 0.3 | −1 | −26 |
| EXAMPLE 4 | P-9 | 150 | 30 | 0.5 | −165 | −94 |
| EXAMPLE 5 | P-9 | 150 | 50 | 0.9 | −203 | −109 |
| EXAMPLE 6 | P-15 | 150 | 50 | 0.3 | −185 | −91 |
| EXAMPLE 7 | P-15 | 150 | 70 | 0.4 | −230 | −120 |
| COMPARATIVE EXAMPLE 1 | HP-1 | — | — | 0.3 | −1 | −2 |
| COMPARATIVE EXAMPLE 2 | HP-2 | — | — | 0.3 | −1 | −25 |
| COMPARATIVE EXAMPLE 3 | HP-3 | — | — | 21 | *2 | *2 |
| COMPARATIVE EXAMPLE 4 | HP-1 | 90 | 30 | 0.3 | −8 | −8 |
| COMPARATIVE EXAMPLE 5 | HP-1 | 90 | 50 | 0.3 | −12 | −12 |
| COMPARATIVE EXAMPLE 6 | HP-2 | 140 | 50 | 0.5 | −50 | −35 |

*1 conversion value at a film thickness of 10 μm
*2 unmeasured due to high haze

TABLE 3

| | RESIN NUMBER | STRETCH TEMPERATURE [° C.] | STRETCH RATIO [%] | HAZE [%] | Re*1 [nm] | Rth*1 [nm] |
|---|---|---|---|---|---|---|
| EXAMPLE 8 | P-13 | — | — | 0.3 | −1 | 0 |
| EXAMPLE 9 | P-13 | 100 | 50 | 0.4 | −83 | −43 |
| COMPARATIVE EXAMPLE 7 | HP-1 | — | — | 0.3 | 0 | 0 |
| COMPARATIVE EXAMPLE 8 | HP-1 | 90 | 50 | 0.3 | −10 | −7 |

*1 conversion value at a film thickness of 10 μm

What is claimed is:

1. A copolymer comprising:
a fumaronitrile residue represented by following General Formula I; and
an aromatic vinyl monomer residue represented by following General Formula II:

[General Formula I]

[General Formula II]

wherein, in General Formula II, $R^1$ is a hydrogen atom, a methyl group or a phenyl group, and $R^2$ is a hydrogen atom or a substituted or unsubstituted aryl group having 6 to 12 carbon atoms, and each of $R^3$, $R^4$, $R^5$, $R^6$ and $R^7$ independently represents a hydrogen atom, a halogen atom, a hydroxy group, an alkoxy group having 1 to 4 carbon atoms, an acyloxy group having 2 to 5 carbon atoms, a cyanomethyl group, or an alkyl group having 1 to 8 carbon atoms, and at least two of $R^2$, $R^3$ and $R^4$ may be bonded to form a ring, and at least two of arbitrary substituents of $R^3$, $R^4$, $R^5$, $R^6$ and $R^7$ may be bonded to form a ring, wherein a content of the fumaronitrile residue is in the range of 40 to 55 mol % when a total of the content of the fumaronitrile residue and a content of the aromatic vinyl monomer residue is 100 mol %.

2. The copolymer, as defined in claim 1, wherein the weight-average molecular weight of the copolymer ranges from 150,000 to 2,000,000.

3. The copolymer, as defined in claim 2, wherein the weight-average molecular weight of the copolymer ranges from 200,000 to 1,500,000.

4. The copolymer, as defined in claim 3, wherein the weight-average molecular weight of the copolymer ranges from 300,000 to 1,500,000.

5. The copolymer, as defined in claim 1, wherein the content of the fumaronitrile residue is in the range of 40 to 51 mol %.

6. The copolymer, as defined in claim 1,
the copolymer further comprising an aliphatic vinyl monomer residue represented by following General Formula III,
wherein a content of aliphatic vinyl monomer residue represented by following General Formula III is in the range of 1 to 40 mol % when a total of a content of the fumaronitrile residue, a content of the aromatic vinyl monomer residue and a content of the aliphatic vinyl monomer residue is 100 mol %:

[General Formula III]

wherein, in General Formula III, $R^8$ is a hydrogen atom or a methyl group, $R^9$ is a cyano group, an alkoxy group having 1 to 8 carbon atoms, an alkoxycarbonyl group having 1 to 12 carbon atoms, an alkylaminocarbonyl group having 1 to 8 carbon atoms, or an alkylcarbonylamino group having 1 to 8 carbon atoms.

7. The copolymer, as defined in claim 1, wherein $R^1$ and $R^2$ in General Formula II are hydrogen atoms.

8. A resin composition comprising:
the copolymer, as defined in claim 1.

9. A film obtained by forming the film from the resin composition, as defined in claim 8.

10. A phase difference film including a film obtained by stretching the film defined in claim 9.

* * * * *